(12) United States Patent
Horiuchi et al.

(10) Patent No.: US 11,701,811 B2
(45) Date of Patent: Jul. 18, 2023

(54) METHOD FOR MANUFACTURING RESIN CONTAINER AND BLOW MOLDING METHOD

(71) Applicant: NISSEI ASB MACHINE CO., LTD., Nagano (JP)

(72) Inventors: Kazuhiro Horiuchi, Nagano (JP); Manabu Ogihara, Nagano (JP); Atsushi Nagasaki, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 101 days.

(21) Appl. No.: 17/440,614

(22) PCT Filed: Mar. 18, 2020

(86) PCT No.: PCT/JP2020/012010
§ 371 (c)(1),
(2) Date: Sep. 17, 2021

(87) PCT Pub. No.: WO2020/189723
PCT Pub. Date: Sep. 24, 2020

(65) Prior Publication Data
US 2022/0161481 A1 May 26, 2022

(30) Foreign Application Priority Data

Mar. 20, 2019 (JP) .................................. 2019-052406
Mar. 20, 2019 (JP) .................................. 2019-052497
Apr. 9, 2019 (JP) .................................. 2019-073979

(51) Int. Cl.
*B29C 49/06* (2006.01)
*B29C 49/64* (2006.01)
(Continued)

(52) U.S. Cl.
CPC .............. *B29C 49/66* (2013.01); *B29C 49/06* (2013.01); *B29C 49/062* (2013.01);
(Continued)

(58) Field of Classification Search
CPC ....... B29C 49/06; B29C 49/062; B29C 49/36; B29C 49/6409; B29C 45/7207
See application file for complete search history.

(56) References Cited

U.S. PATENT DOCUMENTS 4,592,719 A   6/1986  Bellehache et al.
5,229,043 A   7/1993  Lee
(Continued)

FOREIGN PATENT DOCUMENTS

CN   1076155    9/1993
CN   1592678    3/2005
(Continued)

OTHER PUBLICATIONS

Extended European Search Report issued in European Patent Application No. 20774380.8 dated Nov. 7, 2022.
(Continued)

*Primary Examiner* — Robert B Davis
(74) *Attorney, Agent, or Firm* — Greenblum & Bernstein, P.L.C.

(57) ABSTRACT

In a method for manufacturing a resin container, in the adjusting the temperature of the preform, the preform is accommodated in a cavity mold, a refrigerant introduction member is inserted into the preform, the refrigerant introduction member including a first flow path and a second flow path which are different in introduction or discharge position of a refrigerant, the preform is cooled by bringing the preform into close contact with an inner wall of the cavity mold at a pressure of the refrigerant introduced from the refrigerant introduction member. When the preform is
(Continued)

cooled, cooling is performed by switching between a first cooling blow for introducing the refrigerant from the first flow path and discharging the refrigerant from the second flow path and a second cooling blow for introducing the refrigerant from the second flow path and discharging the refrigerant from the first flow path.

11 Claims, 12 Drawing Sheets

(51) Int. Cl.
    *B29C 45/72*    (2006.01)
    *B29C 49/66*    (2006.01)
    *B29L 31/00*    (2006.01)

(52) U.S. Cl.
    CPC .. *B29C 49/6409* (2013.01); *B29C 2049/6661* (2013.01); *B29C 2049/6692* (2013.01); *B29L 2031/7158* (2013.01)

(56) References Cited

U.S. PATENT DOCUMENTS

| | | |
|---|---|---|
| 6,223,541 B1 | 5/2001 | Farrag |
| 6,299,431 B1 | 10/2001 | Neter |
| 6,461,556 B2 | 10/2002 | Neter |
| 2003/0108638 A1 | 6/2003 | Neper et al. |
| 2005/0042324 A1 | 2/2005 | Unterlander et al. |
| 2006/0138696 A1 | 6/2006 | Weinmann |
| 2011/0305789 A1 | 12/2011 | Neper et al. |
| 2013/0099420 A1* | 4/2013 | Ha ..................... B29C 45/7207 425/556 |
| 2014/0271963 A1* | 9/2014 | Keir ....................... B29C 71/02 425/143 |

FOREIGN PATENT DOCUMENTS

| | | |
|---|---|---|
| JP | 57-105321 | 6/1982 |
| JP | 04-65214 A | 3/1992 |
| JP | 5-185493 A | 7/1993 |
| JP | 10-113978 | 5/1998 |
| JP | 2004-515392 A | 5/2004 |
| JP | 2006-035667 A | 2/2006 |
| JP | 2012-511442 A | 5/2012 |
| JP | 2017-126121 A | 7/2017 |
| JP | 2019-018514 A | 2/2019 |
| TW | 200300388 | 6/2003 |
| TW | 200426015 | 12/2004 |
| WO | 2017/098673 A1 | 6/2017 |

OTHER PUBLICATIONS

Office Action issued in Chinese Patent Application No. 202080022233.5 dated Nov. 1, 2022, along with English translation thereof.

Office Action issued in Korean Patent Application No. 10-2021-7033322 dated Sep. 30, 2022, along with English translation thereof.

International Search Report issued in International Patent Application No. PCT/JP2020/012010, dated May 26, 2020, along with English translation thereof.

Written Opinion of the International Searching Authority issued in International Patent Application No. PCT/JP2020/012010, dated May 26, 2020, along with English translation thereof.

Office Action issued in Japan Counterpart Patent Appl. No. 2020-170354, dated Aug. 3, 2021, along with English translation thereof.

Office Action issued in Indian Patent Application No. 202117047008 dated Mar. 2, 2022, along with English translation thereof.

* cited by examiner

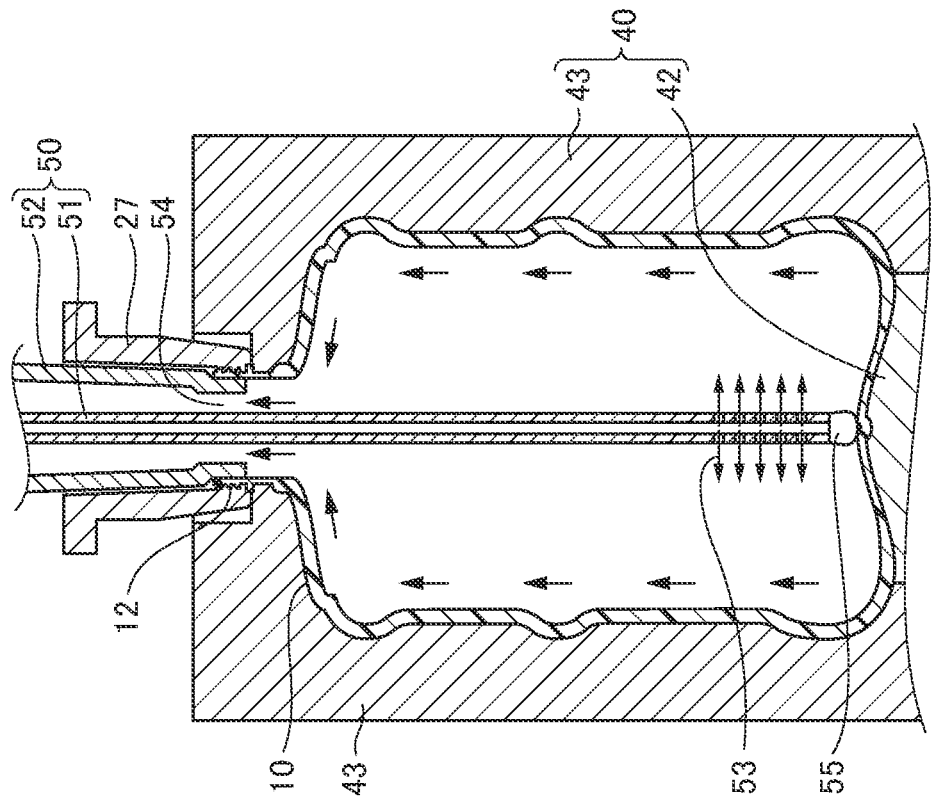
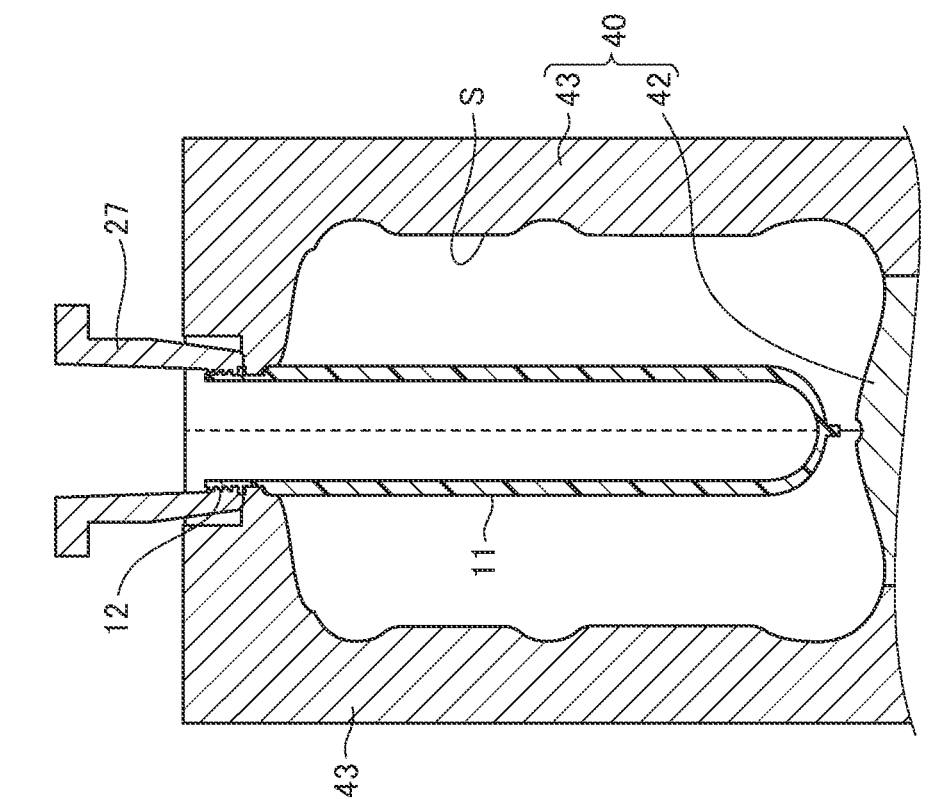

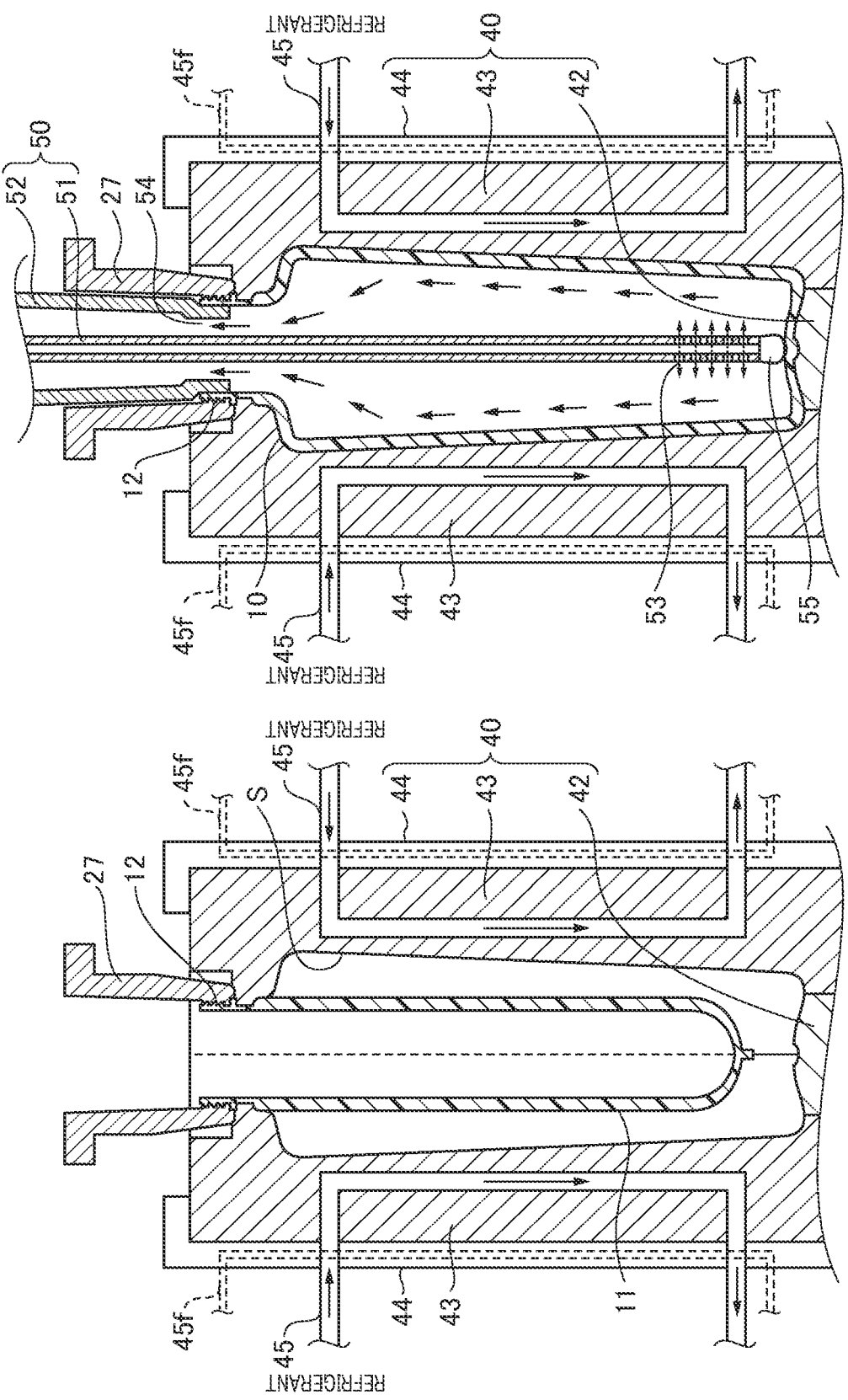

METHOD FOR MANUFACTURING RESIN CONTAINER AND BLOW MOLDING METHOD

BACKGROUND OF THE INVENTION

Field of the Invention

The present invention relates to a method for manufacturing a resin container and a blow molding apparatus.

Description of the Related Art

Conventionally, a hot parison blow molding method has been known as one of methods for manufacturing a resin container. The hot parison blow molding method is a method of blow-molding a resin container using residual heat during injection molding of a preform, and is advantageous in that it is possible to manufacture a resin container which has a wide variety of types and excellent in aesthetic appearance as compared with a cold parison method.

Regarding the hot parison blow molding method, various proposals have been made for the purpose of shortening a molding cycle. In order to shorten the molding cycle, it is important to shorten the injection molding time of the preform (the cooling time of the preform), which is the rate-determining step, as in WO 2017/098673 A and JP H5 185493 A, for example.

When the cooling time of the preform in the injection molding step is shortened in the hot parison blow molding, the appearance defect and deterioration in physical properties of the container may occur due to insufficient cooling of the preform. In order to suppress such adverse effects, it is required to cool the preform in a step after the injection molding step.

In addition, even when a synthetic resin such as polyethylene terephthalate (PET) capable of manufacturing a transparent container is used as a material of a preform, if a preform at high temperature after injection molding is slowly cooled in a temperature zone (crystallization temperature zone) in which crystallization is promoted, crystallization due to spherulite generation occurs, and whitening (cloudiness) occurs in the preform. Therefore, when the preform at high temperature after injection molding is cooled, it is necessary to rapidly cool the preform to lower the inner layer temperature thereof below the crystallization temperature zone.

In addition, when the molding cycle is speeded up, the processing time in each step is shortened, and therefore efficient cooling of the preform in the molding cycle is strongly demanded.

Furthermore, the shape, size, thickness distribution, maximum thickness, and weight of the preform are designed in consideration of the type, shape, and size of the container to be manufactured, required specifications (physical properties, transparency, and the like), and the like, and in consideration of the stretch ratio of each portion. That is, there are various shapes of the preform to be cooled.

SUMMARY OF THE INVENTION

A method for manufacturing a resin container according to an aspect of the present invention includes: injection-molding a preform made of a resin and having a bottomed shape; adjusting a temperature of the preform manufactured in the injection molding; and blow-molding the preform adjusted in temperature to manufacture a resin container. In the adjusting the temperature of the preform, the preform is accommodated in a cavity mold, a refrigerant introduction member is inserted into the preform, the refrigerant introduction member including a first flow path and a second flow path which are different in introduction or discharge position of a refrigerant, the preform is cooled by bringing the preform into close contact with an inner wall of the cavity mold at a pressure of the refrigerant introduced from the refrigerant introduction member. When the preform is cooled, cooling is performed by switching between a first cooling blow for introducing the refrigerant from the first flow path and discharging the refrigerant from the second flow path and a second cooling blow for introducing the refrigerant from the second flow path and discharging the refrigerant from the first flow path.

Further features of the present invention will become apparent from the following description of exemplary embodiments with reference to the attached drawings.

BRIEF DESCRIPTION OF THE DRAWINGS

FIGS. 4A and 4B are diagrams illustrating an operation example of a blow molding step.

FIGS. 8A and 8B are diagrams illustrating an operation example of a blow molding step in a second embodiment.

DESCRIPTION OF THE EMBODIMENTS

Figure 1:
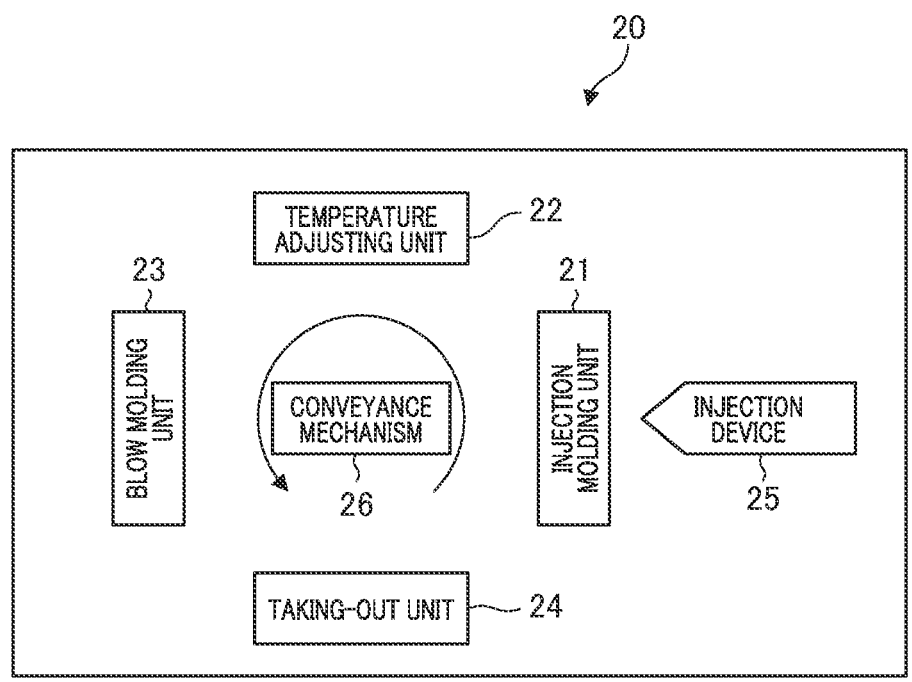
FIG. 1 is a block diagram schematically illustrating a configuration of a blow molding apparatus.

Hereinafter, embodiments of the present invention will be described with reference to the drawings.

In the embodiments, for easy understanding, structures and elements other than a main part of the present invention will be described in a simplified or omitted manner. In the drawings, the same elements are denoted by the same reference numerals. In the drawings, shapes, dimensions, and the like of a container and a preform are schematically illustrated, and do not indicate actual shapes, dimensions, and the like.

First Embodiment

<Description of Blow Molding Apparatus>

First, a blow molding apparatus 20 for manufacturing a container 10 will be described with reference to FIG. 1. FIG. 1 is a block diagram schematically illustrating a configuration of the blow molding apparatus 20. The blow molding apparatus 20 of the present embodiment is an apparatus of hot parison type (also referred to as a one-stage type) that performs blow molding by utilizing residual heat (internal heat amount) during injection molding without cooling a preform 11 to room temperature.

The blow molding apparatus 20 includes an injection molding unit 21, a temperature adjusting unit 22, a blow molding unit 23, a taking-out unit 24, and a conveyance mechanism 26. The injection molding unit 21, the temperature adjusting unit 22, the blow molding unit 23, and the taking-out unit 24 are disposed at positions rotated by a predetermined angle (for example, 90 degrees) around the conveyance mechanism 26.

(Conveyance Mechanism 26)

The conveyance mechanism 26 includes a rotating plate (not illustrated) that rotates about an axis in a direction perpendicular to the drawing sheet of FIG. 1. On the rotating plate, one or more neck molds 27 (not illustrated in FIG. 1) that hold a neck portion 12 of a preform 11 or a resin container (hereinafter, simply referred to as a container) 10 are arranged at each predetermined angle. The conveyance mechanism 26 rotates the rotating plate to convey the preform 11 (or the container 10) having the neck portion 12 held by the neck mold 27 to the injection molding unit 21, the temperature adjusting unit 22, the blow molding unit 23, and the taking-out unit 24 in this order. The conveyance mechanism 26 can also raise and lower the rotating plate, and also performs operations related to closing and opening (releasing) for the preform in the injection molding unit 21.

(Injection Molding Unit 21)

Figure 2:
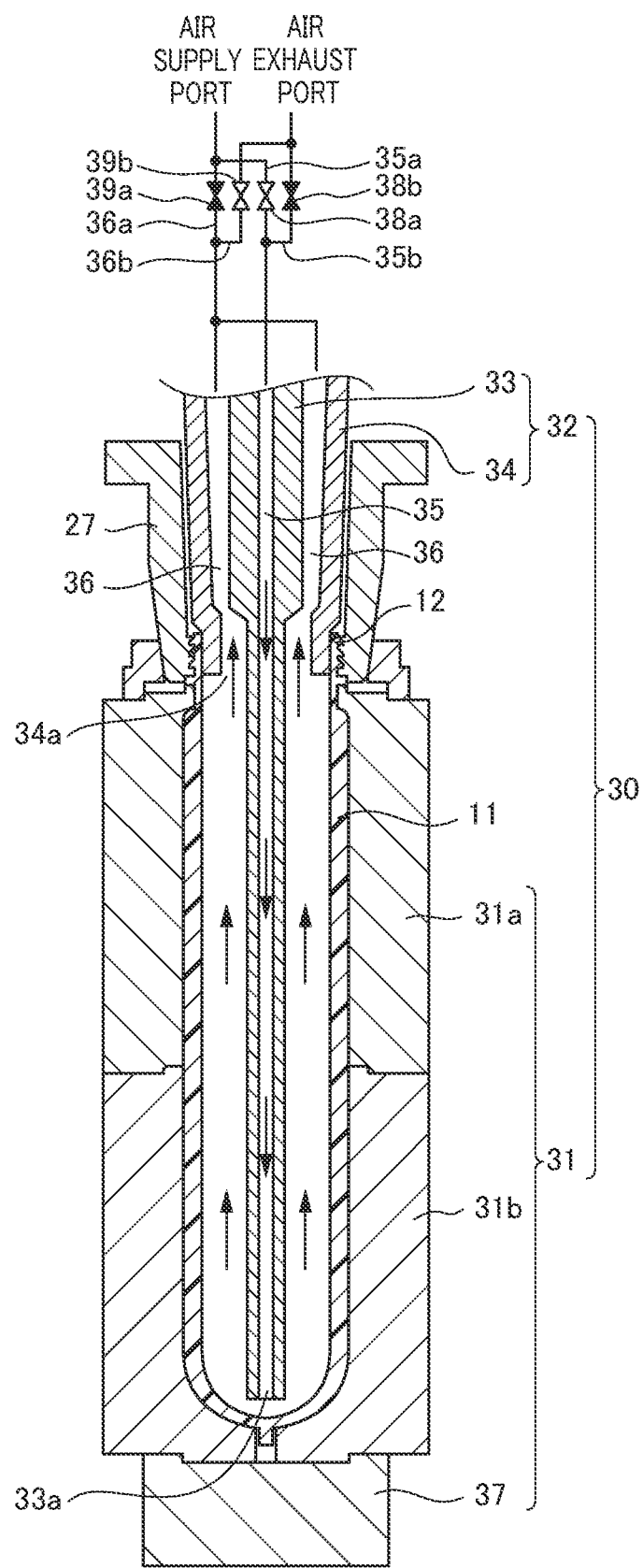
FIG. 2 is a diagram illustrating an example of first cooling blow in a temperature adjusting step.
Figure 3:
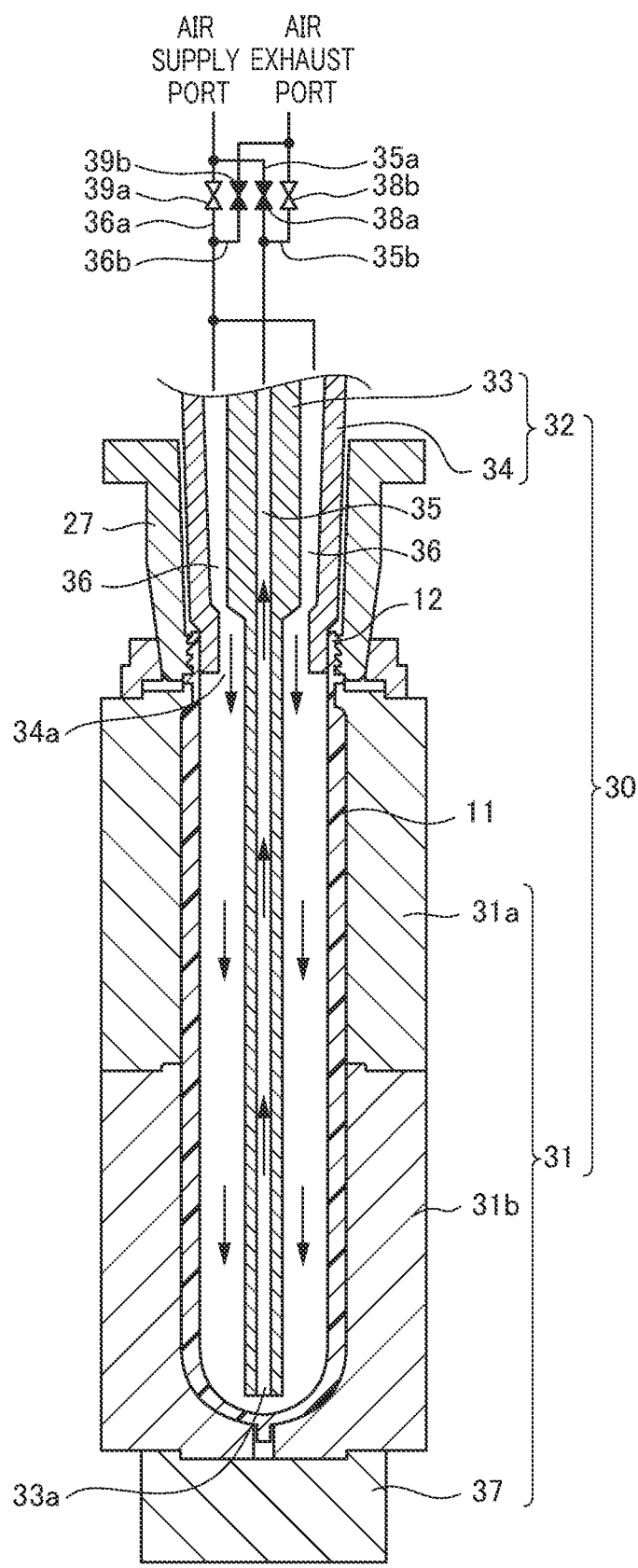
FIG. 3 is a diagram illustrating an example of second cooling blow in the temperature adjusting step.

The injection molding unit 21 includes an injection cavity mold and an injection core mold (not illustrated), and manufactures the preform 11 illustrated in FIGS. 2 and 3. An injection device 25 that supplies a resin material, which is a raw material of the preform 11, is connected to the injection molding unit 21.

In the injection molding unit 21, the injection cavity mold, the injection core mold, and the neck mold 27 of the conveyance mechanism 26 are closed to form a preform-shaped mold space. Then, by pouring the resin material from the injection device 25 into the preform-shaped mold space, the preform 11 is manufactured by the injection molding unit 21.

Here, the entire shape of the preform 11 is a bottomed cylindrical shape in which one end side is opened and the other end side is closed. The neck portion 12 is formed at an end portion of the preform 11 on the opening side.

In addition, the materials of the container 10 and the preform 11 are thermoplastic synthetic resins, and can be appropriately selected according to the use of the container 10. Specific examples of the materials include PET (polyethylene terephthalate), PEN (polyethylene naphtha late), PCTA (polycyclohexanedimethylene terephthalate), Tritan ((registered trademark): co-polyester manufactured by Eastman Chemical Co., Ltd.), PP (polypropylene), PE (polyethylene), PC (polycarbonate), PES (polyethersulfone), PPSU (polyphenylsulfone), PS (polystyrene), COP/COC (cyclic olefin polymer), PMMA (polymethyl methacrylate: acrylic), PLA (polylactic acid), and the like.

Even when the injection molding unit 21 is opened, the neck mold 27 of the conveyance mechanism 26 is not released, and the preform 11 is held and conveyed as it is. The number of preforms 11 simultaneously molded by the injection molding unit 21 (that is, the number of containers 10 that can be simultaneously molded by the blow molding apparatus 20) can be appropriately set.

In the present embodiment, in the injection molding unit 21, for example, the preform 11 for a large resin container (filling amount is about 12 L to 15L (about 3 to 5 gallons)) used in a water server is manufactured. This large resin container is required to have high rigidity (load strength) and impact resistance (drop strength) in addition to transparency. When the material is PET, the thickness of a body portion of the preform 11 is limited to about 10 mm at the maximum in order to secure the transparency of the container 10 even if a sufficient cooling time is provided in the injection molding unit 21. In order to increase the rigidity, it is necessary to increase the thickness (increase the weight) of a body portion and a shoulder portion of the container 10, but the thickness of the preform 11 is limited. Therefore, the preform 11 of the container 10 has a shape in which the ratio of the length of the body portion/the length of the neck portion 12 is set to be large, the body portion is set to be thick, and the length thereof is set to be substantially the same as that of the body portion of the container. The preform 11 has a total length of about 400 to 470 mm, a length of the body portion of about 330 to 400 mm, a diameter of the body portion of about 50 to 55 mm, and a weight of about 500 to 750 g, for example.

(Temperature Adjusting Unit 22)

The temperature adjusting unit 22 equalizes the temperature and removes uneven temperature of the preform 11 manufactured by the injection molding unit 21 to adjust the temperature of the preform 11 to a temperature suitable for final blowing (for example, about 90° C. to 105° C.). The temperature adjusting unit 22 also has a function of cooling the preform 11 at high temperature after injection molding.

As illustrated in FIGS. 2 and 3, the temperature adjusting unit 22 includes a mold unit (temperature control pot) 30 for temperature adjustment. The mold unit 30 includes a cavity mold 31 capable of accommodating the preform 11 and a first air introduction member 32.

The cavity mold 31 is a mold having a temperature control space having substantially the same shape as the preform 11 manufactured by the injection molding unit 21, and is disposed on a support base 37. The cavity mold 31 of the present embodiment includes an upper mold 31a and a lower mold 31b, and is divided into upper and lower two stages.

A flow path (not illustrated) through which a temperature adjustment medium (cooling medium) flows is formed inside each of the upper mold 31a and the lower mold 31b. Therefore, the temperature of the cavity mold 31 is maintained at a predetermined temperature by the temperature adjustment medium flowing inside the upper mold 31a and the lower mold 31b. The temperature distribution of the preform 11 may be changed in the longitudinal direction of the preform 11 by changing the temperature of the temperature adjustment medium of the upper mold 31a and the lower mold 31b.

The temperature of the temperature adjustment medium of the cavity mold 31 is not particularly limited, but can be appropriately selected within a range of, for example, 5° C. to 80° C., preferably 30° C. to 60° C.

Here, the configuration of the cavity mold 31 is not limited to the configuration of the present embodiment. For example, the cavity mold 31 may be configured to be vertically divided into three or more stages. Furthermore, for example, the cavity mold 31 may include a pair of split molds divided in the longitudinal direction of the preform 11. In a case where the cavity mold 31 is a split mold, the body portion of the preform 11 after the temperature adjustment can be made thicker than the neck portion.

The first air introduction member 32 is disposed so as to be movable forward and backward with respect to the neck mold 27 holding the preform 11 by the temperature adjusting unit 22. FIGS. 2 and 3 illustrate a state in which the first air introduction member 32 extends (descends) downward in the drawings and is inserted into the neck mold 27.

The first air introduction member 32 is airtightly abutted against the neck portion 12 of the preform 11 in a state of being inserted into the neck mold 27. The first air introduction member 32 includes a first rod member 33 and a first fitting core (first blow core member) 34.

The first rod member 33 and the first fitting core 34 are both hollow cylindrical bodies, and the first rod member 33 is disposed concentrically inside the first fitting core 34. The tip of the first rod member 33 is inserted to the vicinity of the bottom surface of the preform 11. An opening 33a for supplying or exhausting compressed air (air and gaseous refrigerant) in the preform 11 is formed at the tip of the first rod member 33 located on the bottom portion side of the preform 11, and the inside of the first rod member 33 is connected to a first air flow path 35.

The first fitting core 34 is in close contact with the inner periphery or the upper end surface of the neck portion 12 when the first air introduction member 32 is inserted into the neck mold 27, and maintains airtightness between the preform 11 and the first air introduction member 32. The tip of the first fitting core 34 is inserted or abutted to the position of the neck portion 12 of the preform 11. At the tip of the first fitting core 34 located on the neck portion 12 side of the preform 11, an opening 34a for supplying or exhausting air into the preform 11 is formed. The space between the first rod member 33 and the first fitting core 34 is connected to a second air flow path 36.

The first air flow path 35 is branched in the middle, one branched flow path 35a is connected to an air supply port that receives air from a compressor (not illustrated), and the other branched flow path 35b is connected to an air exhaust port that exhausts air whose temperature has increased due to exhaust heat of the preform 11 to the outside. The flow path 35a is provided with a first air supply control valve 38a that switches between connection and disconnection with the air supply port. The flow path 35b is provided with a first air exhaust control valve 38b that switches between connection and disconnection with the air exhaust port.

Similarly, the second air flow path 36 is branched in the middle, one branched flow path 36a is connected to the air supply port, and the other branched flow path 36b is connected to the air exhaust port. The flow path 36a is provided with a second air supply control valve 39a that switches between connection and disconnection with the air supply port. The flow path 36b is provided with a second air exhaust control valve 39b that switches between connection and disconnection with the air exhaust port.

Each of the first air supply control valve 38a, the first air exhaust control valve 38b, the second air supply control valve 39a, and the second air exhaust control valve 39b is formed of, for example, a solenoid valve. These valves may be constituted by other known valves such as servo valves.

(Blow Molding Unit 23)

The blow molding unit 23 performs blow molding on the preform 11 whose temperature has been adjusted by the temperature adjusting unit 22 to manufacture the container 10.

As illustrated in FIGS. 4A and 4B, the blow molding unit 23 includes a blow molding mold 40 corresponding to the shape of the container 10 and a second air introduction member 50 also serving as an extending rod of the preform 11.

The blow molding mold 40 includes a bottom mold 42 and a pair of blow cavity split molds 43 and 43.

The blow cavity split molds 43 and 43 are mold members that define the shape of the container 10 excluding the bottom surface. The blow cavity split molds 43 and 43 are divided by a parting plane along the vertical direction in FIGS. 4A and 4B, and are configured to be openable and closable in the horizontal direction in FIGS. 4A and 4B.

The bottom mold 42 is a mold member that is disposed below the blow cavity split molds 43 and 43 and defines the shape of the bottom surface of the container 10. A mold space S defining the shape of the container 10 is formed by closing the bottom mold 42 and the blow cavity split molds 43 and 43. The mold space S of the present embodiment corresponds to a large container for a water server having a filling amount of about 12 L to 20 L.

The second air introduction member 50 is disposed so as to be movable forward and backward with respect to the neck mold 27 holding the preform 11 in the blow molding unit 23. In FIG. 4A, the second air introduction member 50 is in a retracted state in which it is not inserted into the neck mold 27. FIG. 4B illustrates a state in which the second air introduction member 50 extends downward in the drawing and is inserted into the neck mold 27.

The second air introduction member 50 is airtightly abutted against the neck portion 12 of the preform 11 in a state of being inserted into the neck mold 27. The second air introduction member 50 includes a second rod member 51 and a second fitting core (second blow core member) 52.

The second rod member 51 and the second fitting core 52 are both hollow cylindrical bodies, and the second rod member 51 is disposed concentrically inside the second fitting core 52. The second rod member 51 is an extending rod, and is configured to be able to advance and retreat in the vertical direction in the drawing with respect to the second fitting core 52. The tip of the second rod member 51 is provided with an abutting portion 55 that comes into contact with the inner bottom surface of the preform 11 to prevent misalignment of center during extending.

The inside of the second rod member 51 constitutes a flow path for introducing air from a compressor (not illustrated). In addition, a plurality of openings 53 for ejecting air into the preform 11 are formed on the peripheral surface in the vicinity of the tip of the second rod member 51.

The second fitting core 52 is in close contact with the inner periphery of the neck portion 12 when the second air introduction member 50 is inserted into the neck mold 27, and maintains airtightness between the preform 11 (or the container 10) and the second air introduction member 50. The tip of the second fitting core 52 is inserted to the position of the neck portion 12 of the preform 11. At the tip of the second fitting core 52 located on the neck portion 12 side of the preform 11, an opening 54 for exhausting air from the inside of the preform 11 is formed. In addition, the space between the second rod member 51 and the second fitting core 52 constitutes a flow path for exhausting the air ejected into the preform 11 to the outside.

(Taking-Out Unit 24)

Returning to FIG. 1, the taking-out unit 24 is configured to release the neck portion 12 of the container 10 manufactured by the blow molding unit 23 from the neck mold 27 and take out the container 10 to the outside of the blow molding apparatus 20.

<Description of Blow Molding Method>

Figure 5:
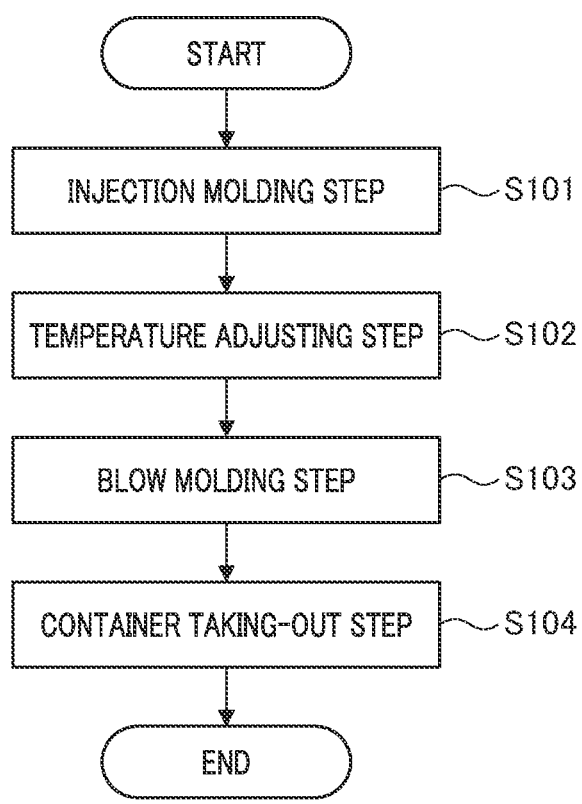
FIG. 5 is a flowchart illustrating steps of a blow molding method.

Next, a blow molding method by the blow molding apparatus 20 of the present embodiment will be described. FIG. 5 is a flowchart illustrating steps of the blow molding method.

(Step S101: Injection Molding Step)

First, in the injection molding unit 21, a resin is injected from the injection device 25 into a preform-shaped mold space formed by the injection cavity mold, the injection core mold, and the neck mold 27 of the conveyance mechanism 26 to manufacture the preform 11.

In step S101, the injection molding unit 21 is opened immediately after the completion of the resin filling or after the minimum cooling time provided after the resin filling. That is, the preform 11 is released from the injection cavity mold and the injection core mold in a high temperature state in which the outer shape of the preform 11 can be maintained. Thereafter, the rotating plate of the conveyance mechanism 26 rotates by a predetermined angle, and the preform 11 held in the neck mold 27 is conveyed to the temperature adjusting unit 22.

Figure 6:
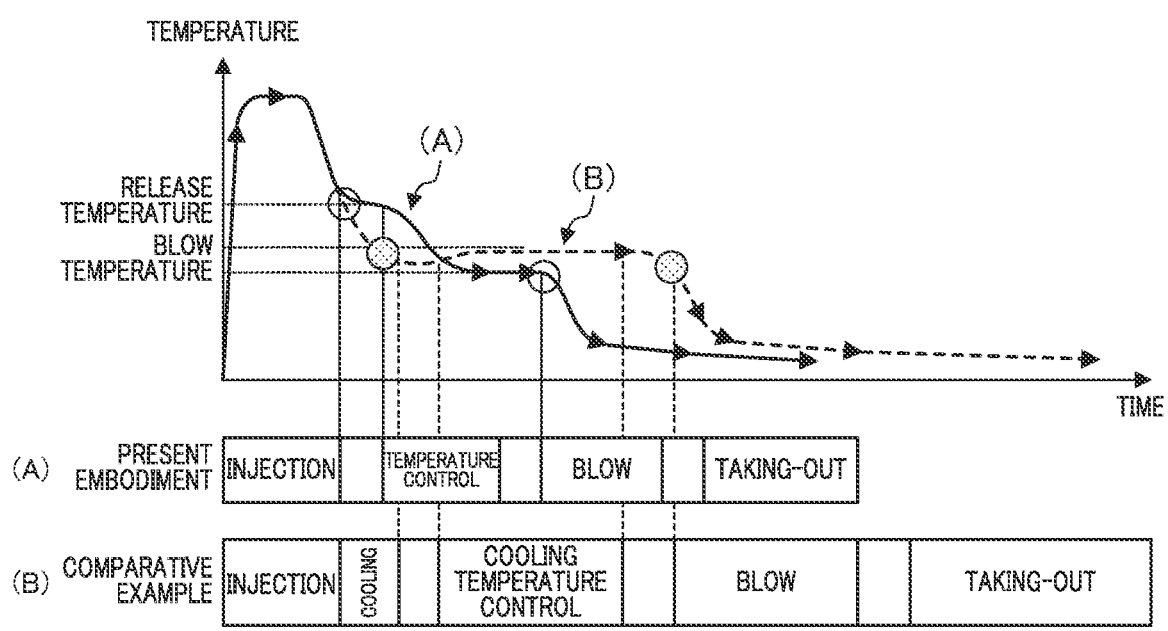
FIG. 6 is a graph showing an example of temperature change of a preform in the blow molding method of each of the present embodiment and a comparative example.

Here, a temperature change of the preform 11 in the blow molding method of the present embodiment will be described with reference to FIG. 6. In FIG. 6, the vertical axis represents the temperature of the preform 11, and the horizontal axis represents time. In FIG. 6, an example of the temperature change of the preform of the present embodiment is shown in (A) of FIG. 6. An example of a temperature change of a preform of a comparative example (conventional method) described later is shown in (B) of FIG. 6. The blank between the steps is the time required to transfer the preform 11 or the container 10, and is the same.

In the present embodiment, when the resin material is injection-molded at a temperature equal to or higher than the melting point of the resin material, only minimum cooling of the preform 11 after injection molding is performed in the injection molding unit 21, and cooling and temperature adjustment of the preform 11 are performed in the temperature adjusting unit 22. In the present embodiment, the time (cooling time) for cooling the resin material after completion of injection of the resin material by the injection molding unit 21 is preferably ½ or less of the time (injection time) for injecting the resin material. The time for cooling the resin material can be made shorter than the time for injecting the resin material depending on the weight of the resin material. The time for cooling the resin material is more preferably ⅖ or less, still more preferably ¼ or less, and particularly preferably ⅕ or less with respect to the time for injecting the resin material. Since the cooling time is significantly shortened as compared with the comparative example, a skin layer (surface layer in a solidified state) of the preform is formed to be thinner than that in the conventional case, and a core layer (internal layer in a softened or molten state) is formed to be thicker than that in the conventional case. That is, as compared with the comparative example, a preform having a large thermal gradient between the skin layer and the core layer and having high residual heat at a high temperature is molded.

In the present embodiment, the injection-molded preform 11 is released from the injection molding unit 21 at a higher release temperature than in the comparative example, and is conveyed to the temperature adjusting unit 22. With the movement to the temperature adjusting unit 22, the temperature of the preform 11 is equalized by heat exchange (heat conduction) between the skin layer and the core layer. Further, the preform 11 is slightly cooled from the outer surface by the contact with the outside air. However, the temperature of the preform 11 is maintained at a substantially high release temperature until the preform 11 is carried into the temperature adjusting unit 22. In the temperature adjusting unit 22, the temperature of the preform 11 is lowered from the high release temperature to the blow temperature, and then the temperature of the preform 11 is maintained at the blow temperature until blow molding is performed. In addition, since the preform in a high temperature state is rapidly cooled in the temperature adjusting unit 22, whitening (cloudiness) due to spherulite generation crystallization that may occur when the preform is slowly cooled is also suppressed.

The blow temperature is a temperature suitable for blow molding, and is set to 90° C. to 105° C. for a PET resin, for example. However, when the blow temperature is low, the stretch orientation of the preform 11 is better, and the strength (physical properties) of the container can be enhanced. Therefore, the blow temperature is preferably set to 90° C. to 95° C. for a PET resin, for example.

Here, due to the structure of the blow molding apparatus 20, the injection molding step, a temperature adjusting step, a blow molding step, and a container taking-out step have the same length of time. Similarly, the conveyance times between the steps are the same.

On the other hand, as a comparative example, an example of a temperature change of the preform ((B) in FIG. 6) when the preform 11 is cooled in the injection molding step will be described.

In the comparative example, the preform 11 is cooled to a temperature lower than or substantially equal to the blow temperature in the mold of the injection molding unit 21. As a result, in the comparative example, the time of the injection molding step is longer than that in the present embodiment. Then, since the time of each step is set in accordance with the time of the injection molding step which is the longest, the time of the molding cycle of the container becomes long as a result.

(Step S102: Temperature Adjusting Step)

Subsequently, the temperature adjusting unit 22 performs temperature adjustment for bringing the temperature of the preform 11 close to a temperature suitable for the final blow.

As illustrated in FIG. 2, in the temperature adjusting step, first, the preform 11 is accommodated in the preform-shaped temperature control space of the cavity mold 31. Subsequently, the first air introduction member 32 is inserted into the neck portion 12 of the preform 11 accommodated in the cavity mold 31. At this time, the neck portion 12 of the preform 11 and the first fitting core 34 are brought into close contact with each other to maintain airtightness therebetween.

Thereafter, cooling blow of the preform 11 is performed. In the cooling blow of the preform 11 of the present embodiment, as illustrated in FIGS. 2 and 3, the preform 11 is cooled by switching the direction in which air flows.

For example, first cooling blow (FIG. 2) in which air is first introduced from the bottom portion side of the preform 11 and the air is discharged from the neck portion side of the preform 11 is performed. Next, second cooling blow (FIG. 3) in which air is introduced from the neck portion side of the preform 11 and the air is discharged from the bottom portion side of the preform 11 is performed.

During the first cooling blow, the first air supply control valve 38a is opened and the first air exhaust control valve 38b is closed. As a result, the first air flow path 35 is connected to the air supply port, and air is introduced into the preform 11 from the opening 33a of the first rod member 33 located on the bottom portion side of the preform 11.

Further, during the second cooling blow, the second air supply control valve 39a is closed, and the second air exhaust control valve 39b is opened. As a result, the second air flow path 36 is connected to the air exhaust port, and the air in the preform 11 is exhausted from the opening 34a of the first fitting core 34 located on the neck portion side of the preform 11.

In the first cooling blow, since the air continues to be ejected from the opening 33a of the first rod member 33, the preform 11 is cooled from the inside by the air flowing inside. The air flowing inside the preform 11 has a low temperature at the bottom portion, but the temperature gradually increases toward the neck portion due to heat exchange with the preform 11. Therefore, in the first cooling blow, the cooling effect on the bottom portion side of the preform 11 is higher than that on the neck portion side of the preform 11.

On the other hand, during the second cooling blow, the first air supply control valve 38a is closed, and the first air exhaust control valve 38b is opened. As a result, the first air flow path 35 is connected to the air exhaust port, and the air in the preform 11 is exhausted from the opening 33a of the first rod member 33 located on the bottom portion side of the preform 11.

Further, during the second cooling blow, the second air supply control valve 39a is opened, and the second air exhaust control valve 39b is closed. As a result, the second air flow path 36 is connected to the air supply port, and air is introduced into the preform 11 from the opening 34a of the first fitting core 34 located on the neck portion side of the preform 11.

In the second cooling blow, since the air continues to be ejected from the opening 34a of the first fitting core 34, the preform 11 is cooled from the inside by the air flowing inside. The air flowing inside the preform 11 has a low temperature at the neck portion, but the temperature gradually increases toward the bottom portion due to heat exchange with the preform 11. Therefore, in the second cooling blow, the cooling effect on the neck portion side of the preform 11 is higher than that on the bottom portion side of the preform 11.

In the present embodiment, the first cooling blow and the second cooling blow are performed in the temperature adjusting step, and the preform 11 is cooled by switching the air flow direction. Therefore, as compared with the case where the air flow direction is not switched, the cooling unevenness of the preform 11 in the temperature adjusting step becomes very small, and the possibility that partial whitening occurs in the preform 11 due to insufficient cooling is suppressed. In particular, when the refrigerant is circulated only in one direction with respect to the preform 11 having a shape elongated in the vertical direction, a phenomenon occurs in which only the body portion on the air supply port side of the refrigerant is subcooled, but the body portion on the air exhaust port side of the refrigerant is not sufficiently cooled. As a result, the body portion located on the air exhaust port side of the preform 11 is whitened, and the body portion located on the air supply port side is deprived of the amount of heat required for blow molding, and a container having a good appearance cannot be manufactured. Therefore, the preform 11 having a long body portion and a large wall thickness (high weight), that is, the preform 11 of the large container for a water server cannot be appropriately post-cooled by the conventional temperature adjusting unit 22. However, according to the method of the present embodiment in which the flow direction of the refrigerant in the preform 11 is switched at a predetermined timing, the temperature adjusting unit 22 can post-cool the elongated preform 11 for a large container so as to suppress whitening while maintaining the amount of heat required for blow molding.

Figure 7A:
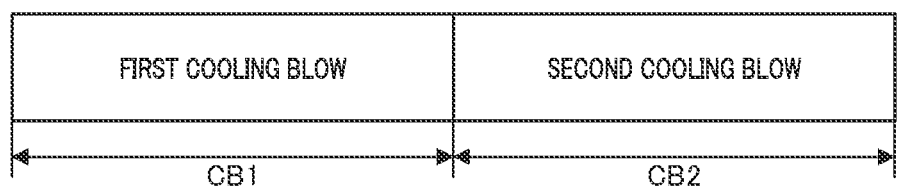
FIGS. 7A and 7B are diagrams illustrating operation examples of the first cooling blow and the second cooling blow in the temperature adjusting step.
Figure 7B:
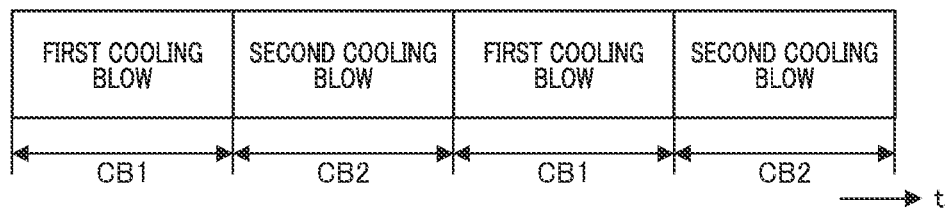

FIGS. 7A and 7B illustrate operation examples of the first cooling blow and the second cooling blow in the temperature adjusting step. From the viewpoint of reducing cooling unevenness of the preform 11, it is preferable to set the time (CB1) of the first cooling blow and the time (CB2) of the second cooling blow in the temperature adjusting step to be equal (CB1-CB2). Switching between the first cooling blow and the second cooling blow may be performed once as illustrated in FIG. 7A, or may be performed a plurality of times as illustrated in FIG. 7B. When it is desired to cause the cooling strength to differ between the body portion close to the neck portion side or the body portion close to the bottom portion side of the preform 11, the time (CB1) of the first cooling blow and the time (CB2) of the second cooling blow may be different as CB1>CB2 or CB1<CB2.

Furthermore, the switching timing between the first cooling blow and the second cooling blow can be appropriately set according to the length, thickness distribution, and shape of the preform 11, the temperature state of the preform 11, and the like. In addition, air supply conditions (flow quantity, flow rate, and pressure) in the first cooling blow and the second cooling blow and the time of the first cooling blow and the time of the second cooling blow can be appropriately set. For example, when it is desired to cause the cooling strength to differ between the body portion close to the neck portion side or the body portion close to the bottom portion side of the preform 11, the air supply conditions of either the first cooling blow or the second cooling blow may be set higher than the other supply conditions.

In both the first cooling blow and the second cooling blow in the temperature adjusting step, the preform 11 receives air pressure from the inside and continues to be in contact with the cavity mold 31 maintained at a predetermined temperature. Therefore, in the temperature adjusting step, the temperature of the preform 11 is adjusted so as not to be equal to or lower than the temperature suitable for blow molding from the outside, and the uneven temperature that occurs during injection molding is also reduced. Since the cavity mold 31 has the preform-shaped space, the shape of the preform is maintained by the cavity mold 31 and does not greatly change.

After the temperature adjusting step, the rotating plate of the conveyance mechanism 26 rotates by a predetermined angle, and the preform 11 after the temperature adjustment held in the neck mold 27 is conveyed to the blow molding unit 23.

(Step S103: Blow Molding Step)

Subsequently, in the blow molding unit 23, the container 10 is blow-molded.

First, the preform 11 is accommodated in the blow molding mold 40 in a state where the bottom mold 42 is stationary and the blow cavity split mold 43 is open. Thereafter, the blow cavity split mold 43 is closed, and as illustrated in FIG. 4A, the blow molding mold 40 is closed to form the mold space S corresponding to the shape of the container 10.

Then, the second air introduction member 50 is inserted into the neck portion 12 of the preform 11 accommodated in the blow molding mold 40. At this time, the neck portion 12 of the preform 11 and the second fitting core 52 are brought into close contact with each other to maintain airtightness therebetween.

When the second air introduction member 50 is inserted into the preform 11, the second rod member 51 is lowered to stretch the preform 11 downward in the drawing.

Subsequently, as illustrated in FIG. 4B, blow air as an example of a pressurized fluid is introduced into the preform 11 from the opening 53 of the second rod member 51. As a result, the preform 11 bulges so as to be in close contact with the mold space S of the blow molding mold 40 and is blow-molded into the container 10.

(Step S104: Container Taking-out Step)

When the blow molding is completed, the blow cavity split mold 43 and the bottom mold 42 are opened. As a result, the container 10 is movable from the blow molding unit 23.

Subsequently, the rotating plate of the conveyance mechanism 26 rotates by a predetermined angle, and the container 10 is conveyed to the taking-out unit 24. In the taking-out unit 24, the neck portion 12 of the container 10 is released from the neck mold 27, and the container 10 is taken out to the outside of the blow molding apparatus 20.

Thus, the series of steps of the blow molding method is completed. Thereafter, by rotating the rotating plate of the conveyance mechanism 26 by a predetermined angle, the respective steps of S101 to S104 described above are repeated.

Hereinafter, effects of the blow molding method of the present embodiment will be described.

When a hot parison preform is molded using a crystalline thermoplastic resin (a resin that can be in a transparent amorphous state or a cloudy crystalline state) as a material, whitening (cloudiness) may occur due to insufficient cooling depending on the material. For example, in a case where a PET resin is used as a material, when the preform is slowly cooled (for example, cooled at room temperature for several 10 seconds) in a temperature zone (120° C. to 200° C.) in which crystallization is promoted, crystallization due to spherulite generation occurs, and the preform tends to be whitened.

Therefore, conventionally, an injection molding mold of the preform is rapidly cooled (for example, at 10° C. for 5 seconds) to shorten the passage time in the crystallization temperature zone, and the preform is sufficiently cooled in the injection molding step to suppress whitening of the preform.

On the other hand, according to the blow molding method of the present embodiment, the step of cooling the preform 11 is almost eliminated in the injection molding step (S101), and the preform 11 is cooled in the temperature adjusting step (S102). In the temperature adjusting step (S102), the temperature of the outer surface of the preform 11 can be effectively adjusted by bringing the preform 11 into close contact with the cavity mold 31. Furthermore, since the air continues to flow without being confined inside the preform 11, the preform 11 can be cooled simultaneously with the temperature adjustment of the preform 11. In the present embodiment, since the temperature adjustment and cooling of the preform 11 can be performed in the temperature adjusting step (S102), the preform 11 can be released even in a high temperature state in the injection molding step (S101), and molding of a next preform 11 can be started early. That is, according to the present embodiment, the container 10 can be favorably molded while the molding cycle time is shortened as compared with the molding cycle time of the comparative example.

In the present embodiment, the first cooling blow (FIG. 2) and the second cooling blow (FIG. 3) are performed in the temperature adjusting step (S102), and the preform 11 is cooled by switching the air flow direction. Therefore, as compared with the case where the air flow direction is not switched, the cooling unevenness of the preform 11 in the temperature adjusting step becomes very small, and the possibility that partial whitening occurs in the preform 11 due to insufficient cooling is suppressed.

Furthermore, in the present embodiment, since the preform 11 can be efficiently cooled by the temperature adjusting unit 22, it is not necessary to apply a preform having a special shape (for example, a shape in which a body is thin) specialized for shortening the molding cycle time unlike Patent Literature 1, for example. In other words, according to the present embodiment, the molding cycle time can be shortened even when a preform designed to have an optimum wall thickness distribution in accordance with the container shape is applied, and a container having good physical properties can be manufactured in a short cycle.

Second Embodiment

A second embodiment is a modification of the first embodiment, and a configuration example for suppressing post-shrinkage of a shaped container will be described.

When the molding cycle is shortened by hot parison blow molding, the cooling time of the blow molding mold in the blow molding step is also shortened. Therefore, as the number of times of blow molding increases at the time of high-cycle continuous molding, the temperature of the blow molding mold gradually rises. When the temperature of the blow molding mold rises, the shaped container is not sufficiently cooled, and thus the container irregularly shrinks after mold release, and there is a possibility that the container does not satisfy the required specifications of appearance and dimensions.

Therefore, in the second embodiment, cooling is performed by circulating the refrigerant in the blow cavity split mold for blow-molding the preform, and post-shrinkage of the shaped container is suppressed.

In the following description of the second embodiment, the same elements as those of the first embodiment are denoted by the same reference numerals, and redundant description will be omitted. A blow molding apparatus 20 of the second embodiment is different in a configuration of a blow molding unit 23.

In an injection molding unit 21 of the second embodiment, for example, a preform 11 for a container 10 having high rigidity is manufactured. The preform 11 is for a container having a filling capacity of, for example, 800 ml or more, and has a weight of 70 g or more, a thickness of a body portion of 4 mm or more, and a length of the body portion of 100 mm or more. The preform 11 is blown at a relatively low stretch ratio (as an example, a surface ratio calculated by the maximum stretch ratio in the longitudinal direction x the maximum stretch ratio in the transverse direction is 7 or less) by the blow molding unit 23 described later, and the container 10 having a thick body portion and high rigidity is manufactured.

As illustrated in FIGS. 8A and 8B, the blow molding unit 23 of the second embodiment includes a blow molding mold 40 corresponding to the shape of the container 10 and a second air introduction member 50 also serving as an extending rod of the preform 11.

The blow molding mold 40 includes a bottom mold 42, a pair of blow cavity split molds 43 and 43, and a pair of accommodating portions (blow cavity split mold fixing plates) 44 and 44. The blow molding mold 40 may include the bottom mold 42 and a pair of blow cavity split mold units described later.

The blow cavity split molds 43 and 43 are mold members that define the shape of the container 10 excluding the bottom surface. The blow cavity split molds 43 and 43 are divided by a parting plane along the vertical direction in FIGS. 8A and 8B (direction substantially vertical to a placement surface of a mold device), and are configured to be openable and closable in the horizontal direction in FIGS. 8A and 8B (direction substantially horizontal to the placement surface of the mold device).

The pair of accommodating portions (blow cavity mold fixing plates) 44 and 44 are disposed with the blow cavity split molds 43 and 43 interposed therebetween, and each accommodate and fix one or more corresponding blow cavity split molds 43. The accommodating portion 44 is connected to an opening/closing mechanism (not illustrated) of the blow cavity split molds 43 and 43, and moves the blow cavity split molds 43 and 43 in the left-right direction of FIGS. 8A and 8B. The accommodating portion 44 is a substantially rectangular member, and includes a first surface for accommodating and fixing the blow cavity split mold 43 and a second surface opposite to the first surface and connected to the opening/closing mechanism (not illustrated).

The blow cavity split mold unit including the blow cavity split mold 43 and the accommodating portion 44, or the blow cavity split mold 43 is provided with a refrigerant flow path 45 for circulating a liquid refrigerant precisely temperature-controlled. The refrigerant flow path 45 is connected to a chiller (cooling water circulation device) (not illustrated), and circulates cooling water (chiller water) from the chiller, which is an example of the refrigerant, to the blow cavity split mold 43. Therefore, the blow cavity split mold 43 is directly cooled by heat exchange with the chiller water. Although not particularly limited, the temperature of the chiller water supplied to the blow cavity split mold 43 is, for example, 0° C. to 20° C., more preferably 5° C. to 15° C., and still more preferably 5° C. to 10° C.

The pair of accommodating portions 44 and 44 may each be provided with a refrigerant flow path 45$f$ for circulating a refrigerant for cooling only the accommodating portions 44 and 44 (see FIGS. 8A and 8B). The accommodating portion 44 and the blow cavity split mold 43 are fixed in close contact with each other, and the amount of heat of the blow cavity mold 43 can be transferred to the accommodating portion 44, so that the temperature rise of the blow cavity mold 43 can be more effectively suppressed.

The bottom mold 42 is a mold member that is disposed below the blow cavity split molds 43 and 43 and defines the shape of the bottom surface of the container 10. A mold space S defining the shape of the container 10 is formed by closing the bottom mold 42 and the blow cavity split molds 43 and 43.

The second air introduction member 50 is disposed so as to be movable forward and backward with respect to the neck mold 27 holding the preform 11 in the blow molding unit 23. In FIG. 8A, the second air introduction member 50 is in a retracted state in which it is not inserted into the neck mold 27. FIG. 8B illustrates a state in which the second air introduction member 50 extends (descends) downward in the drawing and is inserted into the neck mold 27.

The configuration of the second air introduction member 50 is similar to that of the first embodiment, and thus redundant description will be omitted.

Figure 9:
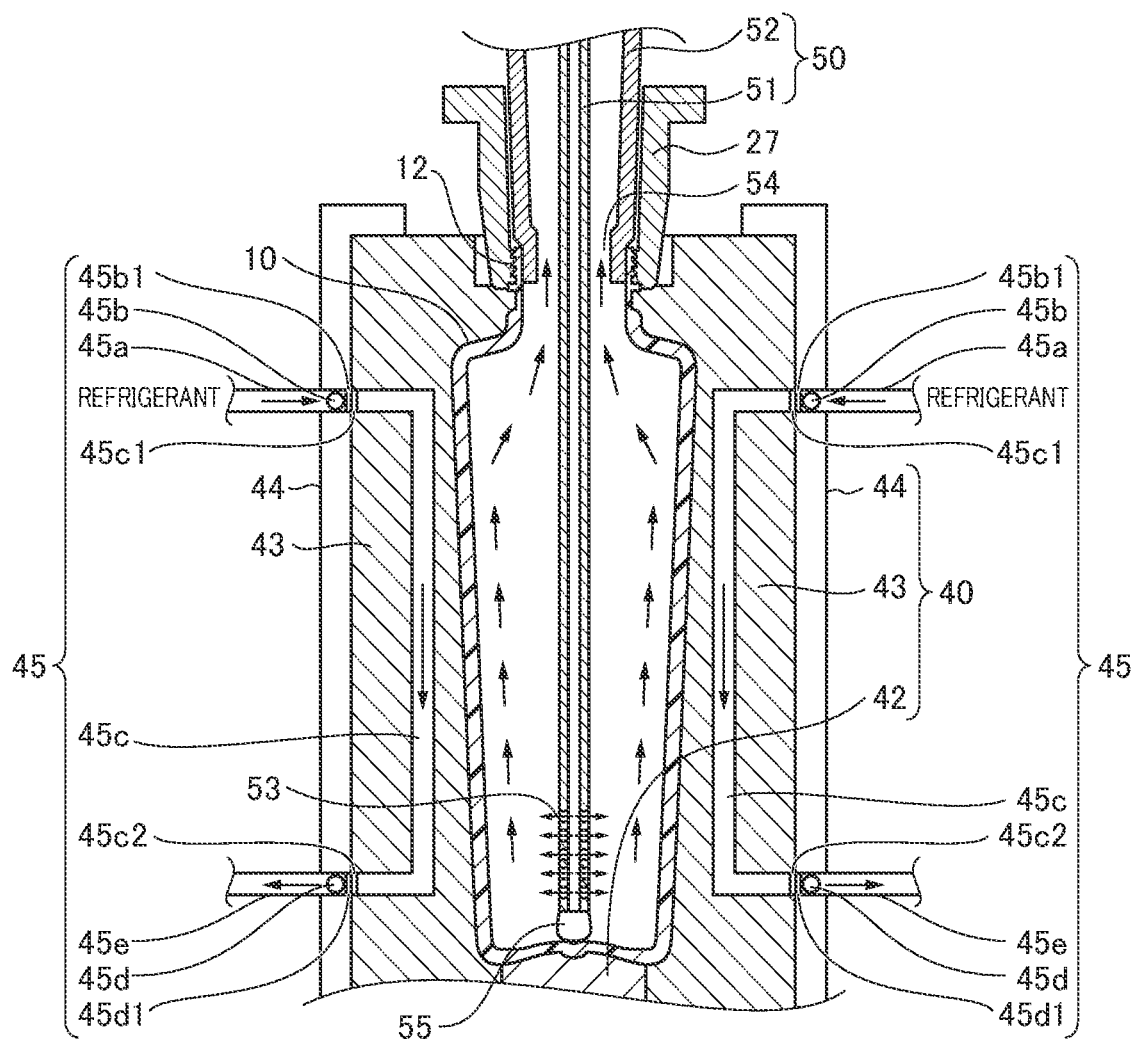
FIG. 9 is a diagram illustrating a configuration example of a refrigerant flow path in a blow cavity split mold unit.

Here, with reference to FIG. 9, as a modification of FIGS. 8A and 8B, a configuration of a refrigerant flow path 45 in the above-described blow cavity split mold unit will be described. FIG. 9 is a diagram corresponding to FIG. 8B. In FIG. 9, the refrigerant flow paths 45$f$ are not illustrated.

The accommodating portion 44 illustrated in FIG. 9 includes a refrigerant supply port 45$a$, a flow dividing path (first refrigerant flow path) 45$b$, a collecting path 45$d$ (second refrigerant flow path), and a discharge port 45$e$. The flow dividing path 45$b$ and the collecting path 45$d$ are formed inside the accommodating portion 44 so as to extend in a direction perpendicular to the drawing sheet orthogonal to the mold opening/closing direction (in parallel to the parting line). The blow cavity split mold 43 includes a cavity refrigerant flow path 45$c$ (third refrigerant flow path) formed so as to surround the cavity of the blow cavity split mold (extending in the vertical direction and the horizontal direction of the blow cavity split mold 43).

The accommodating portion 44 further includes a first supply portion 45$b$1 that causes the refrigerant to flow into the blow cavity split mold 43 and a first discharge portion 45$d$1 that causes the refrigerant to flow out of the blow cavity split mold. The first supply portion 45$b$1 communicates with the flow dividing path 45$b$. The first discharge portion 45$d$1 communicates with the collecting path 45$d$.

The blow cavity split mold 43 further includes a second supply portion 45$c$1 that allows the refrigerant to flow in from the accommodating portion 44 and a second discharge portion 45$c$2 that allows the refrigerant to flow out to the accommodating portion 44. The second supply portion 45$c$1 and the second discharge portion 45$c$2 communicate with the cavity refrigerant flow path 45$c$.

The flow of the refrigerant in the blow cavity split mold unit including the refrigerant flow path 45 illustrated in FIG. 9 will be described. First, the refrigerant is formed in a refrigerant source (not illustrated) and is supplied to the supply port 45$a$ of the accommodating portion 44 at once (collectively) (upstream side). The supplied refrigerant passes through the flow dividing path 45$b$ and reaches the first supply portion 45$b$1 located on the contact surface with each blow cavity split mold 43. Next, the refrigerant is distributed via the second supply portion 45$c$1 of the adjacent blow cavity split mold 43 to flow through the cavity refrigerant flow path 45$c$, and cools the blow cavity split mold 43 to cool the container 10 in contact therewith. The refrigerant that has been cooled reaches the second discharge portion 45$c$2 and flows into the first discharge portion 45$d$1 of the adjacent accommodating portion 44. The refrigerant from each blow cavity split mold 43 is collected in the collecting path 45$d$ via the first discharge portion 45$d$1. Finally, the refrigerant is discharged to the outside of the apparatus at a time via the discharge ports 45$e$ of the accommodating portions 44 (downstream side). It is possible to efficiently supply and discharge the refrigerant to and from the plurality of blow cavity split molds 43 to cool the plurality of blow cavity split molds 43 and cool the container 10 in a short time while suppressing piping work and the like by the refrigerant flow paths 45. The cooling flow path 45 may be formed only in the blow cavity split mold 43. In this case, the number of blow cavity split molds 43 is preferably 2 or less in consideration of piping work and the like. In this case, the cooling flow path 45 includes the second supply portion 45$c$1, the second discharge portion 45$c$2, and the cavity refrigerant flow path 45$c$. The refrigerant of the refrigerant source (not illustrated) is supplied to the second supply portion 45$c$1, flows through the cavity refrigerant flow path 45$c$ to cool the blow cavity split mold 43 and the container 10 in contact therewith, and is discharged to the outside of the apparatus via the second discharge portion 45$c$2.

The direction in which the refrigerant flows in the blow cavity split mold 43 (blow molding mold 40) may be appropriately changed according to the container 10 to be molded. That is, the direction in which the refrigerant flows may be a direction from down to up in the blow cavity split mold 43 besides the direction from up to down (FIGS. 8A, 8B, and 9).

Next, a blow molding method of the second embodiment will be described.

In the blow molding method of the second embodiment, similarly to the first embodiment, an injection molding step (S101), a temperature adjusting step (S102), a blow molding step (S103), and a container taking-out step (S104) are sequentially performed.

In the blow molding method of the second embodiment, the injection molding step, the temperature adjusting step, and the container taking-out step are the same as those in the first embodiment.

However, in the temperature adjusting step of the second embodiment, when cooling blow for the preform 11 is performed, air may be introduced from the bottom portion side of the preform 11 and discharged from the neck portion side of the preform 11. In this cooling blow, since the air continues to be ejected from an opening 33a of a first rod member 33, the preform 11 is cooled from the inside by the air flowing inside. In addition, since air whose temperature has increased due to exhaust heat of the preform 11 is exhausted to the outside, the air whose temperature has increased due to the exhaust heat of the preform 11 does not stay and hinder the cooling. When the cooling blow is performed, air may be introduced from the neck side of the preform 11 and the air may be discharged from the bottom portion side of the preform 11 as necessary.

In the blow molding step of the second embodiment, the following steps are performed by the blow molding unit 23.

First, the preform 11 is accommodated in the blow molding mold 40 in a state where the bottom mold 42 is stationary and the blow cavity split mold 43 is open. Thereafter, the blow cavity split mold 43 is closed, and as illustrated in FIG. 8A, the blow molding mold 40 is closed to form the mold space S corresponding to the shape of the container 10.

Then, the second air introduction member 50 is inserted into a neck portion 12 of the preform 11 accommodated in the blow molding mold 40. At this time, the neck portion 12 of the preform 11 and a second fitting core 52 are brought into close contact with each other to maintain airtightness therebetween.

When the second air introduction member 50 is inserted into the preform 11, a second rod member 51 is lowered to stretch the preform 11 downward in the drawing.

Subsequently, as illustrated in FIG. 8B, blow air is introduced into the preform 11 from an opening 53 of the second rod member 51. As a result, the preform 11 is shaped to bulge so as to be in close contact with the mold space S of the blow molding mold 40 and is blow-molded into the container 10.

Here, the blow molding mold 40 also functions that cooling the container 10 by receiving heat from the preform 11 when shaping the container 10. In the present embodiment, since the blow cavity split mold 43 of the blow molding mold 40 is directly cooled by the circulation of the chiller water flowing through the refrigerant flow path 45, the temperature hardly rises even at the time of high-cycle continuous molding. Furthermore, when the refrigerant flow path 45b is provided in the accommodating portion 44, the temperature rise of the blow cavity split mold 43 can be suppressed more effectively.

Usually, cooling of a blow molding mold is performed by utilizing an idle time zone in the blow molding step. However, under short molding cycle conditions, this idle time also becomes very short, and the temperature cannot be lowered to a specified value before the container is released from the blow molding mold and a next preform is blown, and the blow molding mold cannot be sufficiently cooled. As the thickness of the container to be molded increases, it is difficult to cool the blow molding mold. This is because the amount of heat exchange between the blow cavity split mold and the preform or the container becomes a large value when a container having a thick body portion and high rigidity is blow-molded from a preform having a high weight and large residual heat. Therefore, even if the structure of the conventional blow molding mold is adopted at the time of high-cycle continuous molding, it is substantially impossible to manufacture a thick container so as not to cause post-shrinkage of a shoulder portion and a heel portion after mold release. In addition, in the case of high-cycle molding, the preform 11 is released at a temperature higher than usual and has high residual heat. Therefore, in the case of high-cycle molding, the temperature of the container to be blow-molded becomes higher than that in the conventional case, and as a result, a stronger cooling treatment than that in the conventional case is required.

On the other hand, with the blow molding mold 40 of the present embodiment, even when preforms 11 and containers 10 having a high weight and a large amount of heat exchange with the blow cavity split mold 43 are continuously molded in a high cycle, it is possible to satisfactorily mass-produce the containers 10 satisfying the required specifications without causing post-shrinkage.

In the blow molding step (S103) of the present embodiment, the blow cavity split mold 43 that receives heat from the preform 11 when the container 10 is shaped is directly cooled by the circulation of the chiller water. As a result, since the shaped container 10 is sufficiently cooled by the blow molding mold 40, it is possible to suppress irregular post-shrinkage of the container 10 after mold release.

In addition, since the temperature of the blow molding mold 40 is hardly raised by the cooling of the chiller water, the cooling effect of the container 10 by the blow molding mold 40 is maintained as it is even at the time of high-cycle continuous molding in which the time for releasing heat from the mold is short. Therefore, according to the present embodiment, it is possible to suppress irregular post-shrinkage of the container 10 after mold release even at the time of high-cycle continuous molding.

The present invention is not limited to the above embodiments, and various improvements and design changes may be made without departing from the gist of the present invention.

For example, in the cooling blow in the temperature adjusting step, the position at which air is introduced into the preform 11 and the position at which air is discharged from the preform 11 can be appropriately changed.

Figure 10A:
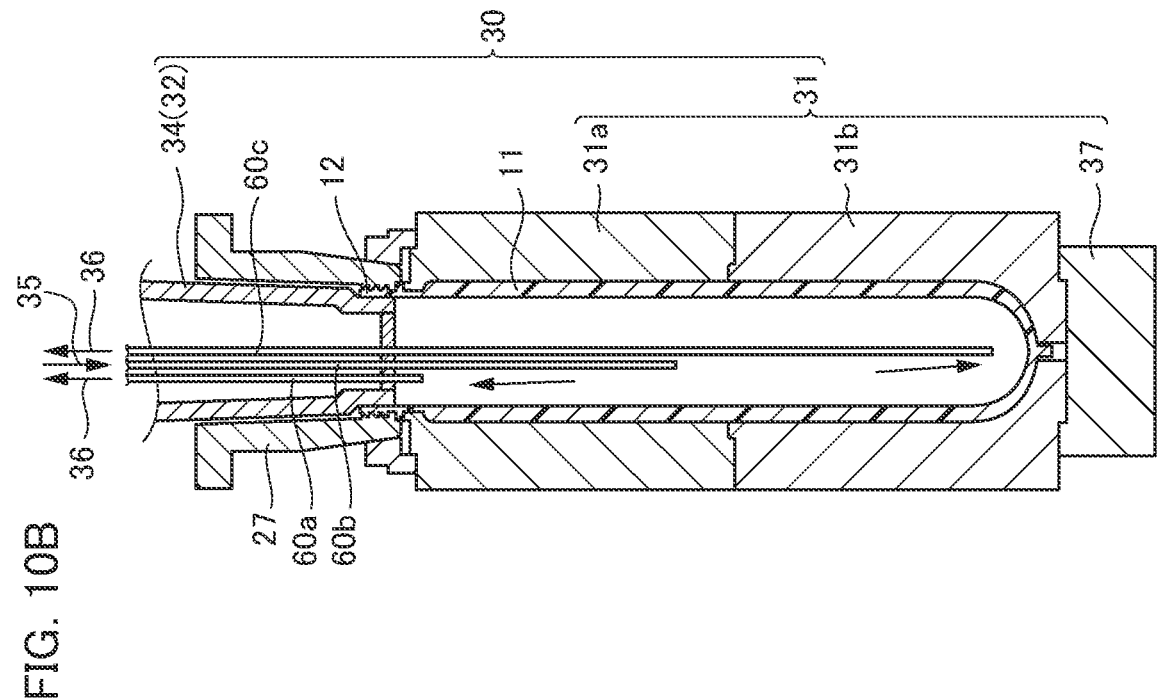
FIGS. 10A and 10B are diagrams illustrating a modification of the temperature adjusting step of the blow molding apparatus.
Figure 10B:
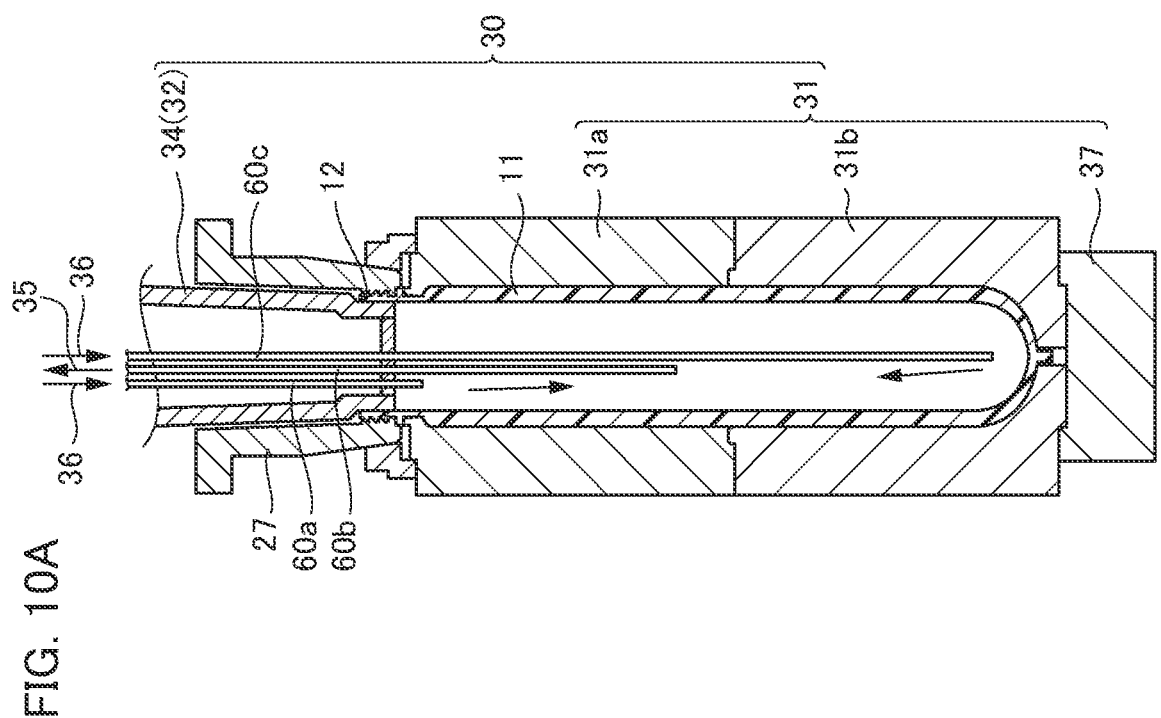

For example, as illustrated in FIGS. 10A and 10B, at least three pipes 60a, 60b, and 60c having different insertion positions into the preform 11 may be provided as the first air introduction member 32 of the temperature adjusting unit 22. The tip of the pipe 60a is located on the neck portion side of the preform 11, and the tip of the pipe 60c is located on the bottom portion side of the preform 11. The tip of the pipe 60b is located between the tip of the pipe 60a and the tip of the pipe 60c. That is, a unit including the first air flow path 35 and the second air flow path 36 is arranged off-center with respect to the vertical axis center of the preform 11. The pipes 60a, 60b, and 60c are schematically illustrated.

In the example of FIG. 10A, air is introduced into the preform 11 by the pipe 60a and the pipe 60c, and the air is discharged from the preform 11 by the pipe 60b. Further, in the example of FIG. 10B, air is introduced into the preform 11 by the pipe 60b, and the air is discharged from the preform 11 by the pipe 60a and the pipe 60c.

Also in the examples of FIGS. 10A and 10B, the preform 11 is cooled by switching the air flow direction in the temperature adjusting step (S102), so that the same effects as those of the above embodiments can be obtained. Further, according to the examples of FIGS. 10A and 10B, since the cooling blow can be performed also from the intermediate position of the preform, it is possible to further suppress the cooling unevenness of the preform 11 in the temperature adjusting step. Further, the pipes 60a, 60b, and 60c may be configured to be rotatable in the circumferential direction of the preform 11. As a result, post-cooling can be performed in parallel while removing uneven temperature of the preform 11.

Figure 11A:
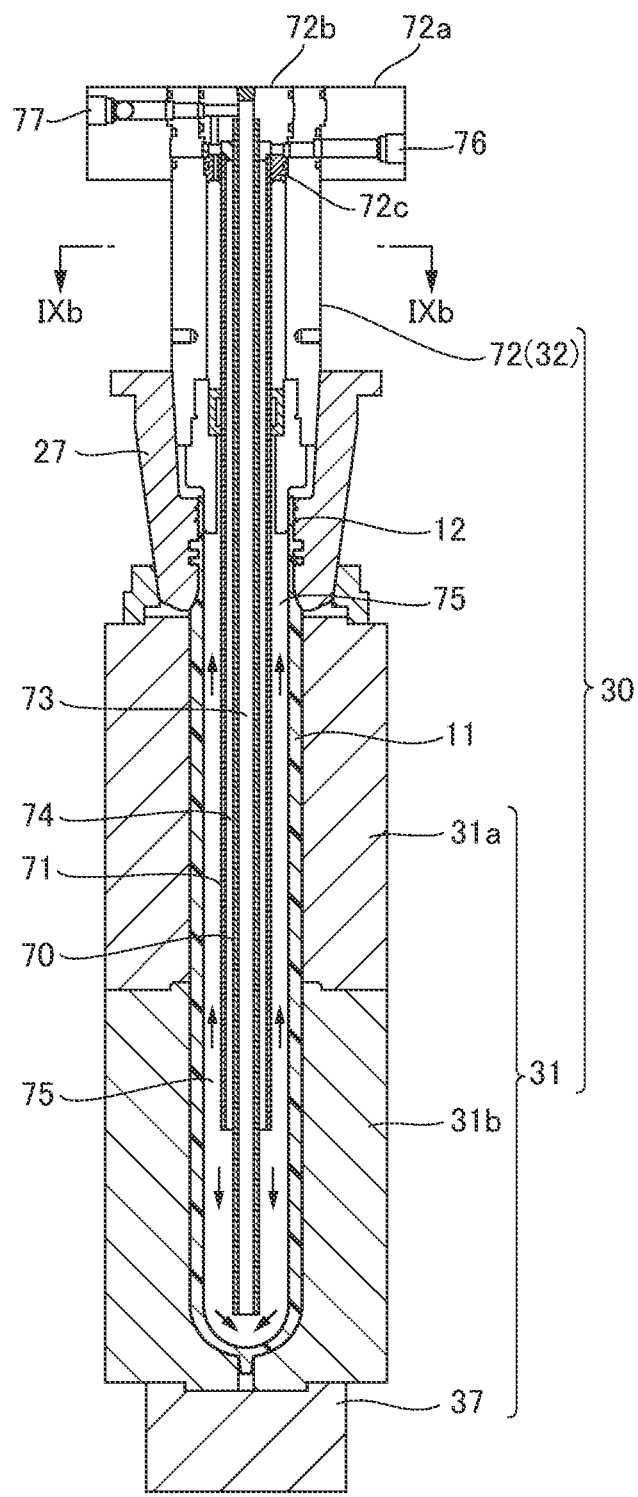
FIGS. 11A and 11B are diagrams illustrating a further modification of the temperature adjusting step of the blow molding apparatus.
Figure 11B:
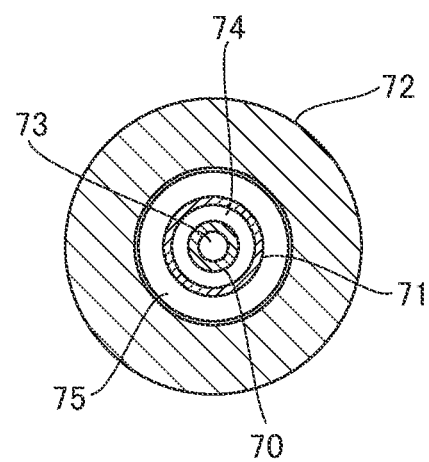

FIGS. 11A, 11B, 12A, and 12B illustrate an example in which the first air introduction member 32 has a double pipe structure as a modification of the temperature adjusting unit 22. In the example of FIGS. 11A and 11B, since the configuration of the cavity mold 31 is similar to that of the above embodiments, redundant description is omitted.

The first air introduction member 32 illustrated in FIG. 11A includes an inner rod member 70, an outer rod member 71, and a first fitting core (first blow core member) 72.

The inner rod member 70, the outer rod member 71, and the first fitting core 72 are all hollow cylindrical bodies, and the inner rod member 70, the outer rod member 71, and the first fitting core 72 are disposed concentrically in this order when viewed from the inside. Circumferential gaps are formed between the inner rod member 70 and the outer rod member 71 and between the outer rod member 71 and the first fitting core 72.

The axial length of the inner rod member 70 is set to such a dimension that the tip of the inner rod member 70 is located near the bottom portion of the preform 11 when the first air introduction member 32 is inserted into the preform 11. The axial length of the outer rod member 71 is set shorter than the axial length of the inner rod member 70. When the first air introduction member 32 is inserted into the preform 11, the tip of the outer rod member 71 is located at a substantially intermediate position of the body portion of the preform 11.

As a result, when the first air introduction member 32 is inserted into the preform 11, a first flow path 73 inside the inner rod member 70, a second flow path 74 between the inner rod member 70 and the outer rod member 71, and a third flow path 75 between the outer side of the outer rod member 71 and the inner periphery of the preform 11 are formed.

Figure 12A:
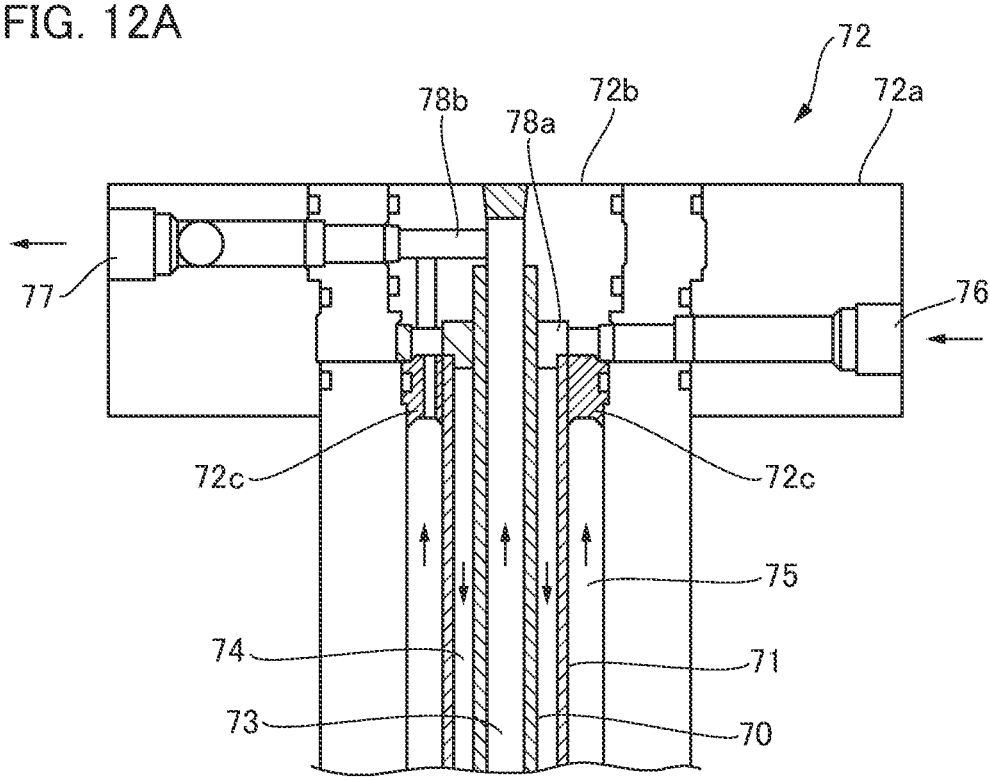
FIGS. 12A and 12B are schematic diagrams illustrating switching of a flow path of a first air introduction member illustrated in FIGS. 11A and 11B.
Figure 12B:
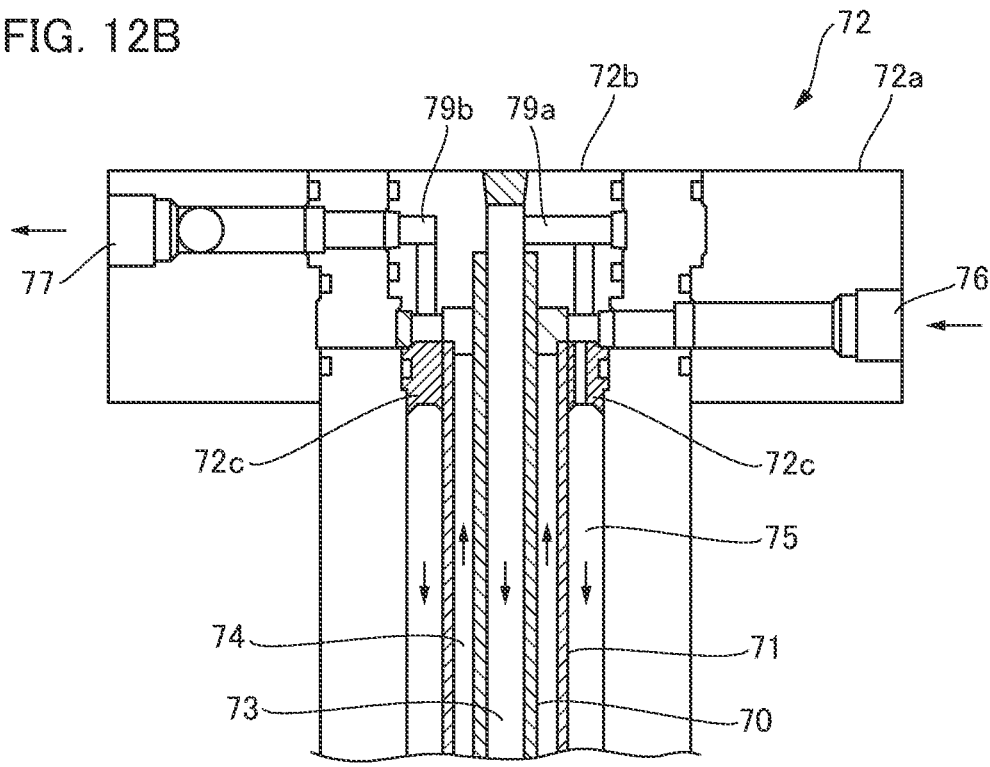

The first flow path 73 extends to the vicinity of the bottom portion of the preform 11 where the tip of the inner rod member 70 is located in the axial direction. The second flow path 74 extends to a predetermined position of the body portion of the preform 11 where the tip of the outer rod member 71 is located in the axial direction. In addition, the third flow path 75 extends from the position of the tip of the outer rod member 71 to the inside of the first fitting core 72 in the axial direction. FIG. 12B is a cross-sectional view taken along the line IXb-IXb in FIG. 12A.

The first fitting core 72 includes a fixing block 72a, a first support member 72b that supports the inner rod member 70, and a second support member 72c that supports the outer rod member 71.

The fixing block 72a is formed on the outer periphery of the upper end portion of the first fitting core 72 in the drawing. Air circulation ports 76 and 77 for introducing and discharging air (for supplying and exhausting air) are formed in the fixing block 72a.

The first support member 72b and the second support member 72c are disposed on the inner periphery of the upper end portion of the first fitting core 72 in the drawing. The first support member 72b and the second support member 72c are rotatable between a first position (see FIG. 12A) and a second position (see FIG. 12B) different from the first position with the central axis of the first air introduction member 32 as a rotation axis.

In the first support member 72b, two patterns of flow paths respectively corresponding to the first position and the second position are formed so as to be switchable by the above-described rotation. In this case, one of the air circulation ports 76 and 77 is exclusively used for supplying air, and the other is exclusively used for exhausting air. In the following pattern, the air circulation port 76 is used as an air supply port, and the air circulation port 77 is used as an air exhaust port.

The flow path of the first pattern is a flow path corresponding to the first position. As illustrated in FIG. 12A, the flow path of the first pattern includes an air supply path 78a that connects the second flow path 74 to the air circulation port 76 (air supply port), and an air exhaust path 78b that connects the first flow path 73 and the third flow path 75 to the air circulation port 77 (air exhaust port). In addition, the second support member 12c is configured to cut off the connection between the air supply path 78a and the third flow path 75 at the first position, and connect the air exhaust path 78b and the third flow path 75.

Therefore, in the first position, as an example of the first cooling blow, air is introduced into the preform 11 from the second flow path 74, and the air is discharged from the first flow path 73 and the third flow path 75.

The flow path of the second pattern is a flow path corresponding to the second position. As illustrated in FIG. 12B, the flow path of the second pattern includes an air supply path 79a that connects the first flow path 73 and the third flow path 75 to the air circulation port 76 (air supply port), and an air exhaust path 79b that connects the second flow path 74 to the air circulation port 77 (air exhaust port). In addition, the second support member 72c is configured to cut off the connection between the air exhaust path 79b and the third flow path 75 at the second position, and connect the air supply path 79a and the third flow path 75.

Therefore, in the second position, as an example of the second cooling blow, air is introduced into the preform 11 from the first flow path 73 and the third flow path 75, and the air is discharged from the second flow path 74.

The first support member 72b and the second support member 72c may be fixed to the fixing block 72a so as not to be rotatable with respect to the central axis of the first air introduction member 32. In this case, it is desirable that the air circulation ports 76 and 77 are coupled to an air supply circuit and an air exhaust circuit with a switching valve (not illustrated) such as a solenoid valve interposed therebetween. In this configuration, each of the air circulation ports 76 and 77 can be easily changed to an air supply port or an air exhaust port by control of the switching valve. Here, for example, the same configurations as those of the first air flow path 35 and the second air flow path 36 of the first embodiment illustrated in FIG. 3 can be applied as the connection of the air intake circuit and the air exhaust circuit and the arrangement of the switching valve.

FIG. 11A illustrates a case where the preform 11 is cooled in the state of the first position. In the example of FIG. 11A, control is performed such that air is supplied from the second flow path 74 and exhausted from the third flow path 75 and the first flow path 73. That is, control is performed such that air is ejected from the intermediate position of the body portion of the preform 11, and the air flows from the intermediate position toward the neck portion and the bottom portion. As a result, whitening (crystallization) can be favorably suppressed even in the thick and long preform 11. Contrary to FIG. 11A, control may be performed such that air is ejected from two close positions of the neck portion and the body portion of the preform 11, and the air flows toward the body portion. That is, control may be such that air is supplied from the third flow path 75 and the first flow path 73, and the air may be exhausted from the second flow path 74. In the example of FIG. 11A, the switching of the air direction is not necessarily performed.

In addition, in the configuration example illustrated in FIGS. 11A, 11B, 12A, and 12B, by rotating the first support member 72b and the second support member 72c, it is possible to switch air flows (directions of supply air and exhausting air) in the first flow path 73, the second flow path 74, and the third flow path 75. Therefore, in the configuration example of FIGS. 11A, 11B, 12A, and 12B, the air flow in the first air introduction member 32 can be easily switched.

In addition, in the configuration example illustrated in FIGS. 11A, 11B, 12A, and 12B, the inner rod member 70 and the outer rod member 71 can be replaced with members having different lengths as appropriate according to the specifications such as the length, shape, and thickness of the preform 11. As a result, the air blowing position in the first air introduction member 32 can be set to an optimum position according to the specifications of the preform 11.

In the above embodiments, for example, in the temperature adjusting unit 22 and the blow molding unit 23, the medium for pressurizing the preform 11 is not limited to air, and a gas other than air or a liquid such as water may be used as the pressurizing medium.

In addition, the embodiments disclosed herein are to be considered in all respects as illustrative and not restrictive. The scope of the present invention is indicated not by the above description but by the claims, and it is intended that meanings equivalent to the claims and all modifications within the scope are included.

The invention claimed is:

1. A method for manufacturing a resin container, comprising:
   injection-molding a preform made of a resin and having a bottomed shape;
   adjusting a temperature of the preform manufactured in the injection molding; and
   blow-molding the preform adjusted in temperature to manufacture a resin container,
   wherein, in the adjusting the temperature of the preform, the preform is accommodated in a cavity mold,
   a refrigerant introduction member is inserted into the preform, the refrigerant introduction member including a first flow path and a second flow path which are different in introduction or discharge position of a refrigerant respectively,
   the preform is cooled by bringing the preform into close contact with an inner wall of the cavity mold at a pressure of the refrigerant introduced from the refrigerant introduction member, and
   when the preform is cooled, cooling is performed by switching between a first cooling blow for introducing the refrigerant from the first flow path and discharging the refrigerant from the second flow path and a second cooling blow for introducing the refrigerant from the second flow path and discharging the refrigerant from the first flow path.

2. The method for manufacturing the resin container according to claim 1,
   wherein, in the first cooling blow, the refrigerant is introduced from a bottom portion side of the preform, and the refrigerant is discharged from a neck portion side of the preform, and
   wherein, in the second cooling blow, the refrigerant is introduced from the neck portion side of the preform, and the refrigerant is discharged from the bottom portion side of the preform.

3. The method for manufacturing the resin container according to claim 1,
   wherein, in the first cooling blow, the refrigerant is introduced from an intermediate position between a bottom portion and a neck portion of the preform, and the refrigerant is discharged from the neck portion side and the bottom portion side of the preform, and
   wherein, in the second cooling blow, the refrigerant is introduced from the neck portion side and the bottom portion side of the preform, and the refrigerant is discharged from the intermediate position between the bottom portion and the neck portion of the preform.

4. The method for manufacturing the resin container according to claim 1,
   wherein, in the adjusting the temperature of the preform, a time for performing the first cooling blow and a time for performing the second cooling blow are set equal to each other.

5. The method for manufacturing the resin container according to any claim 1,
   wherein, in the injection molding, a time for cooling a resin material in a mold space after completion of injection of the resin material is ½ or less of a time for injecting the resin material into the mold space.

6. The method for manufacturing the resin container according to any claim 1,
   wherein, in the injection molding, the preform is released from a mold in a high temperature state in which an outer shape of the preform can be maintained.

7. The method for manufacturing the resin container according to claim 5,
   wherein, in the blow molding, a refrigerant is circulated through a pair of blow cavity split molds for blow-molding the preform to cool the preform.

8. The method for manufacturing the resin container according to claim 7,
   wherein times of the injection molding, the adjusting the temperature of the preform, and the blow molding are set to be the same.

9. The method for manufacturing the resin container according to claim 7,
   wherein the refrigerant for cooling the blow cavity split molds is cooling water supplied from a chiller.

10. The method for manufacturing the resin container according to claim 7,
    wherein a temperature of the refrigerant for cooling the blow cavity split molds is 0° C. to 20° C.

11. A blow molding apparatus comprising:
    an injection molding unit configured to injection-mold a preform made of a resin and having a bottomed shape;
    a temperature adjusting unit configured to adjust a temperature of the preform manufactured by the injection molding unit; and a blow molding unit configured to blow-mold the preform adjusted in temperature to manufacture a resin container, wherein the temperature adjusting unit includes:

a cavity mold that accommodates the preform;

a refrigerant introduction member which includes a first flow path and a second flow path which are different in introduction or discharge position of a refrigerant respectively and to be inserted into the preform;

a first switching unit configured to switch a flow direction of the refrigerant in the first flow path; and a second switching unit configured to switch the flow direction of the refrigerant in the second flow path; and wherein the first switching unit and the second switching unit switch between a first cooling blow for introducing the refrigerant from the first flow path and discharging the refrigerant from the second flow path and a second cooling blow for introducing the refrigerant from the second flow path and discharging the refrigerant from the first flow path.

* * * * *